WILLIAM MOORE & WILLIAM PRUETT.
Improvement in Blowers.
No. 127,358.                                    Patented May 28, 1872.
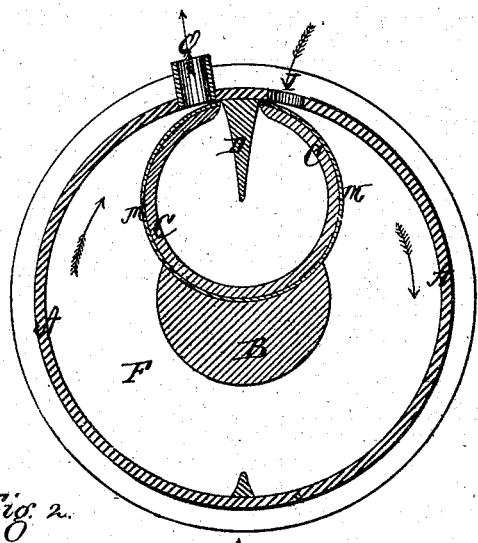
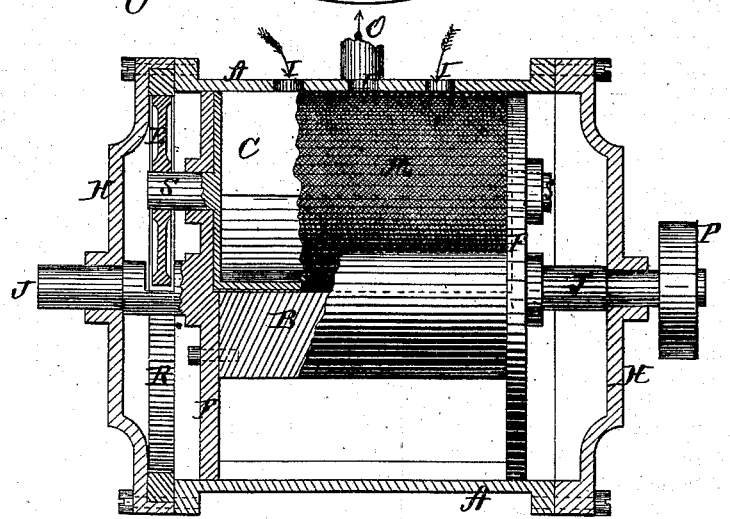
Witnesses:                                      Inventor
Henry N. Miller                                 William Moore
C. L. Evert                                     William Pruett,
                                                per Alexander T. Mason,
                                                               Attorney.

127,358

UNITED STATES PATENT OFFICE.

WILLIAM MOORE AND WILLIAM PRUETT, OF KOKOMO, INDIANA; SAID PRUETT ASSIGNOR TO JOHN CHANDLER, OF SAME PLACE.

IMPROVEMENT IN BLOWERS.

Specification forming part of Letters Patent No. 127,358, dated May 28, 1872.

*To all whom it may concern:*

Be it known that we, WILLIAM MOORE and WILLIAM PRUETT, of Kokomo, in the county of Howard and in the State of Indiana, have invented certain new and useful Improvements in Blowers; and do hereby declare that the following is a full, clear, and exact description thereof, reference being had to the accompanying drawing and to the letters of reference marked thereon making a part of this specification.

The nature of our invention consists in the construction and arrangement of a "pressure-blower" for blowing furnaces, cupolas, forges, or any other purpose where a blast of air is required.

In order to enable others skilled in the art to which our invention appertains to make and use the same, we will now proceed to describe its construction and operation, referring to the annexed drawing, in which—

Figure 1 is a transverse vertical, and Fig. 2 a longitudinal vertical, section of our pressure-blower.

A represents a stationary cylinder or casing, provided with heads H H fastened one to each end. These heads form the supports or bearings for the arbors J J, which support and drive the internal arrangement, power being applied at the pulley P on the end of one of said arbors. On the shaft or arbors J is a semi-cylinder, B, with two flanges, F F, firmly fastened one on each end of the same, said flanges fitting neatly in the outer casing A, thus forming the air-chamber around the semi-cylinder B. Between the flanges F F, and also between the semi-cylinder B and outer casing A, is inserted a hollow cylindrical wing, C, having an opening in one side running the entire length of said wing. This wing is covered around the outside with an elastic substance, M, to deaden the noise while running. The cylindrical wing C is poised on its axles S S in the flanges F F, the arbor at one end passing through the flange, and provided with a toothed wheel, E, which works into an internal gear, R, secured to the casing A, or to the head H.

This causes the cylinder C to revolve on its own axis as it is driven around by the flanges F F. I and O are openings in the outer casing, between which openings is inserted a stop, D, firmly fastened to the inside of the casing, and fitting neatly between the flanges F F, and extending down to the periphery of the semi-cylinder B. The object of this stop is to prevent the air from passing around, thus forcing it out at the pipe O, while by a law of mechanical movement the stop D passes in and out at the opening in the cylinder C, the air entering at I, and thus a continuous blast is kept up when in motion, as indicated by the arrows in Fig. 1. The cylindrical wing C being properly placed in position it will readily be seen that as the semi-cylinder B with the flanges F F revolve in one direction, and carry the wing C with them, the toothed wheel E engaging with the gear R, causes said wing to revolve on its own axis in the opposite direction, and the opening in the said wing will always come right to allow the stop to enter into it—or, in other words, the cylindrical wing passes the stop.

Having thus fully described our invention, what we claim as new, and desire to secure by Letters Patent, is—

1. The semi-cylinder B, provided with flanges F F which fit within the outer casing A, to form an air-chamber around said cylinder, substantially as herein set forth.

2. The cylindrical wing C revolving on its own axis, and also around the inner surface of the casing A, substantially as and for the purposes herein set forth.

3. The combination of the semi-cylinder B, slotted cylindrical wing C, covered on the outside with an elastic substance, M, and the stop D, all constructed and arranged to operate substantially as and for the purposes hereinset forth.

4. The combination of the cylindrical wing C, toothed wheel E, and internal gear R, substantially as and for the purposes herein set forth.

5. The combination of the cylinder A, with heads H H and openings I O, semi-cylinder B, flanges F F, cylindrical wing C covered as described, stop D, toothed wheel E, and internal gear R, all constructed and arranged to operate substantially as and for the purposes herein set forth.

In testimony that we claim the foregoing we have hereunto set our hand this 9th day of March, 1872.

WM. MOORE.
WM. PRUETT.

Witnesses:
ELI HAMILTON,
A. S. BELL.